United States Patent
Gong et al.

(10) Patent No.: US 7,804,660 B2
(45) Date of Patent: Sep. 28, 2010

(54) METHOD FOR UNLOADING HEAD WITHOUT CALIBRATION IN HARD DISK DRIVES

(75) Inventors: Jian Qin Gong, Santa Clara, CA (US); Chang Ik Kang, Santa Clara, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 109 days.

(21) Appl. No.: 12/242,350

(22) Filed: Sep. 30, 2008

(65) Prior Publication Data

US 2010/0079909 A1 Apr. 1, 2010

(51) Int. Cl.
*G11B 21/02* (2006.01)

(52) U.S. Cl. .......................................... 360/75
(58) Field of Classification Search .................. None
See application file for complete search history.

(56) References Cited

U.S. PATENT DOCUMENTS

| | | | | |
|---|---|---|---|---|
| 5,615,064 A | * | 3/1997 | Blank et al. | 360/75 |
| 6,081,112 A | * | 6/2000 | Carobolante et al. | 324/177 |
| 6,154,340 A | * | 11/2000 | Cameron | 360/75 |
| 6,441,987 B1 | * | 8/2002 | Lee | 360/78.04 |

* cited by examiner

*Primary Examiner*—K. Wong
(74) *Attorney, Agent, or Firm*—Ben J. Yorks; Irell & Manella LLP

(57) ABSTRACT

A hard disk drive with a voice coil motor coupled to a head. The disk drive includes a circuit that provides a drive current with a sinusoidal waveform to the voice coil motor during an unload routine. The back emf of the voice coil motor can be determined during a sample period when the current is essentially zero. There is no need to perform a resistance calibration. This reduces the time needed to unload the head.

15 Claims, 4 Drawing Sheets

METHOD FOR UNLOADING HEAD WITHOUT CALIBRATION IN HARD DISK DRIVES

BACKGROUND OF THE INVENTION

1. Field of the Invention

The present invention relates to unloading a head from a disk in a hard disk drive.

2. Background Information

Hard disk drives contain a plurality of magnetic heads that are coupled to rotating disks. The heads write and read information by magnetizing and sensing the magnetic fields of the disk surfaces. Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks.

Information is typically stored in radial tracks that extend across the surface of each disk. Each track is typically divided into a number of segments or sectors. The voice coil motor and actuator arm can move the heads to different tracks of the disks.

Disk drives typically employ a servo to maintain the heads on the centers of the tracks. Deviations from the track center line may create errors in the reading and/or writing of data. The servo utilizes servo bits written into servo fields of the disk. The servo bits are used to produce a position error signal ("PES") that is processed to center the head on the disk track. Each track also includes cylinder information that can be read to determine the track location of the heads.

When a drive is not in use the heads are typically moved off of the disks. For example, the heads can be moved onto a mechanical ramp. As the heads move across the disks the cylinder information can be read and used to determine head location and speed. When the heads move off of the disks there is no longer track information. At this point, the back emf of the voice coil motor can be determined to calculate head speed.

The voltage of a voice coil can be described with the following equation:

$$v = L\,di/dt + Ri + B_{emf}$$

where;

L=The inductance of the voice coil.

di/dt=The time rate of change of the drive current.

i=The drive current.

R=The electrical resistance of the coil and wires.

$B_{emf}$=The back emf of the voice coil motor.

During an unload routine the drive current is typically a DC current, making the inductance component zero. The back emf can be determined by subtracting the DC component Ri from the voice coil voltage. The resistance value may vary because of heat and other factors. Consequently, a calibration routine must be performed during each unload routine to determine the value R before calculating the back emf. Such a routine increases the time required to unload the head.

BRIEF SUMMARY OF THE INVENTION

A hard disk drive with a voice coil motor coupled to a head. The disk drive includes a circuit that provides a drive current with a sinusoidal waveform to the voice coil motor during an unload routine.

DETAILED DESCRIPTION

Described is a hard disk drive with a voice coil motor coupled to a head. The disk drive includes a circuit that provides a drive current with a sinusoidal waveform to the voice coil motor during an unload routine. The back emf of the voice coil motor can be determined directly from the voice coil voltage during a sample period when the current is essentially zero. There is no need to perform a resistance calibration. This reduces the time needed to unload the head.

Figure 1:
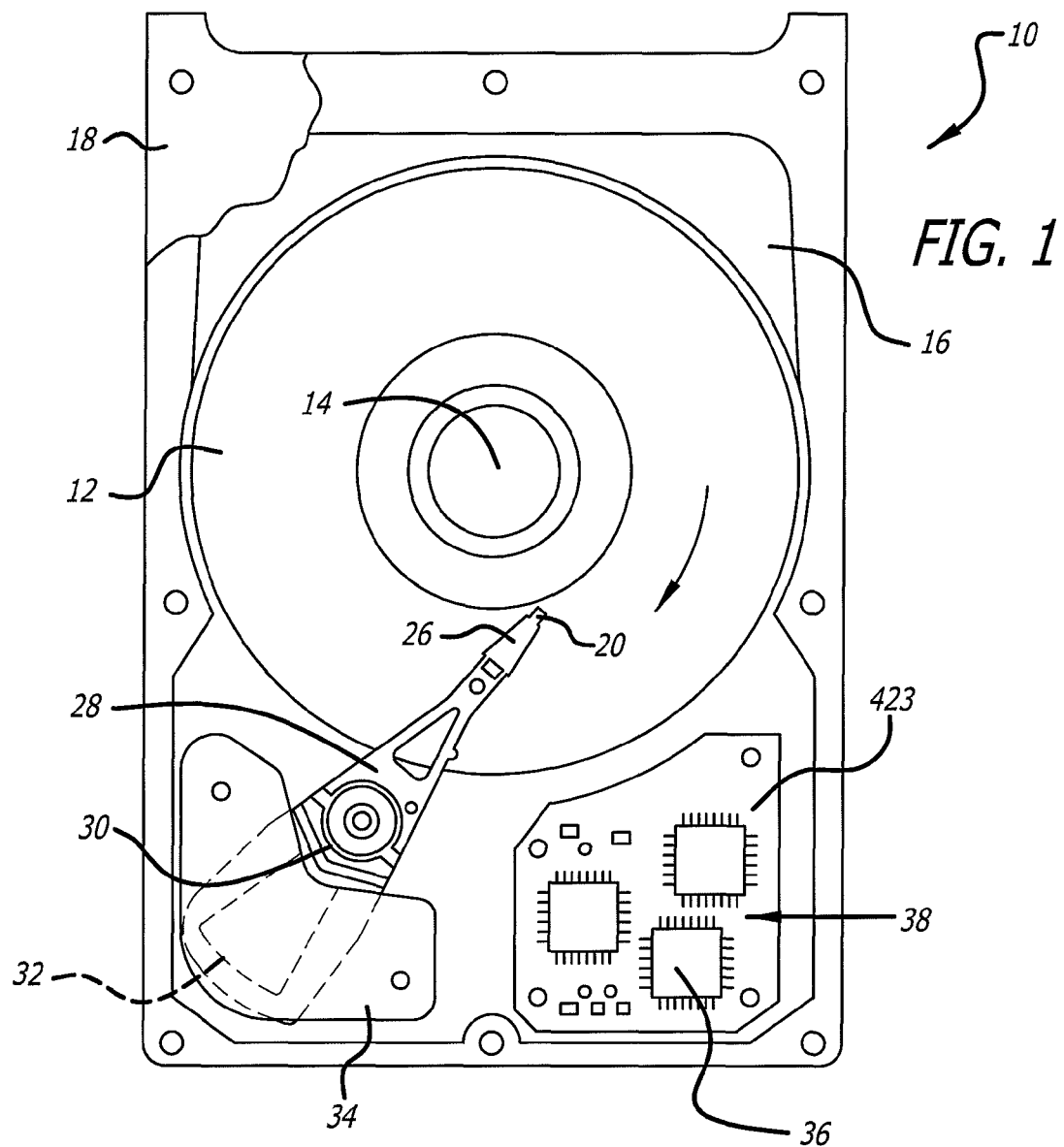
FIG. 1 is a top view of an embodiment of a hard disk drive.

Referring to the drawings more particularly by reference numbers, FIG. 1 shows an embodiment of a hard disk drive 10. The disk drive 10 may include one or more magnetic disks 12 that are rotated by a spindle motor 14. The spindle motor 14 may be mounted to a base plate 16. The disk drive 10 may further have a cover 18 that encloses the disks 12.

The disk drive 10 may include a plurality of heads 20 located adjacent to the disks 12. The heads 20 may have separate write and read elements. The write element magnetizes the disk 12 to write data. The read element senses the magnetic fields of the disks 12 to read data. By way of example, the read element may be constructed from a magneto-resistive material that has a resistance which varies linearly with changes in magnetic flux.

Each head 20 may be gimbal mounted to a suspension arm 26 as part of a head gimbal assembly (HGA). The suspension arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes one or more integrated circuits 40 coupled to a printed circuit board 42. The printed circuit board 40 is coupled to the voice coil 32, heads 20 and spindle motor 14 by wires (not shown).

Figure 2:
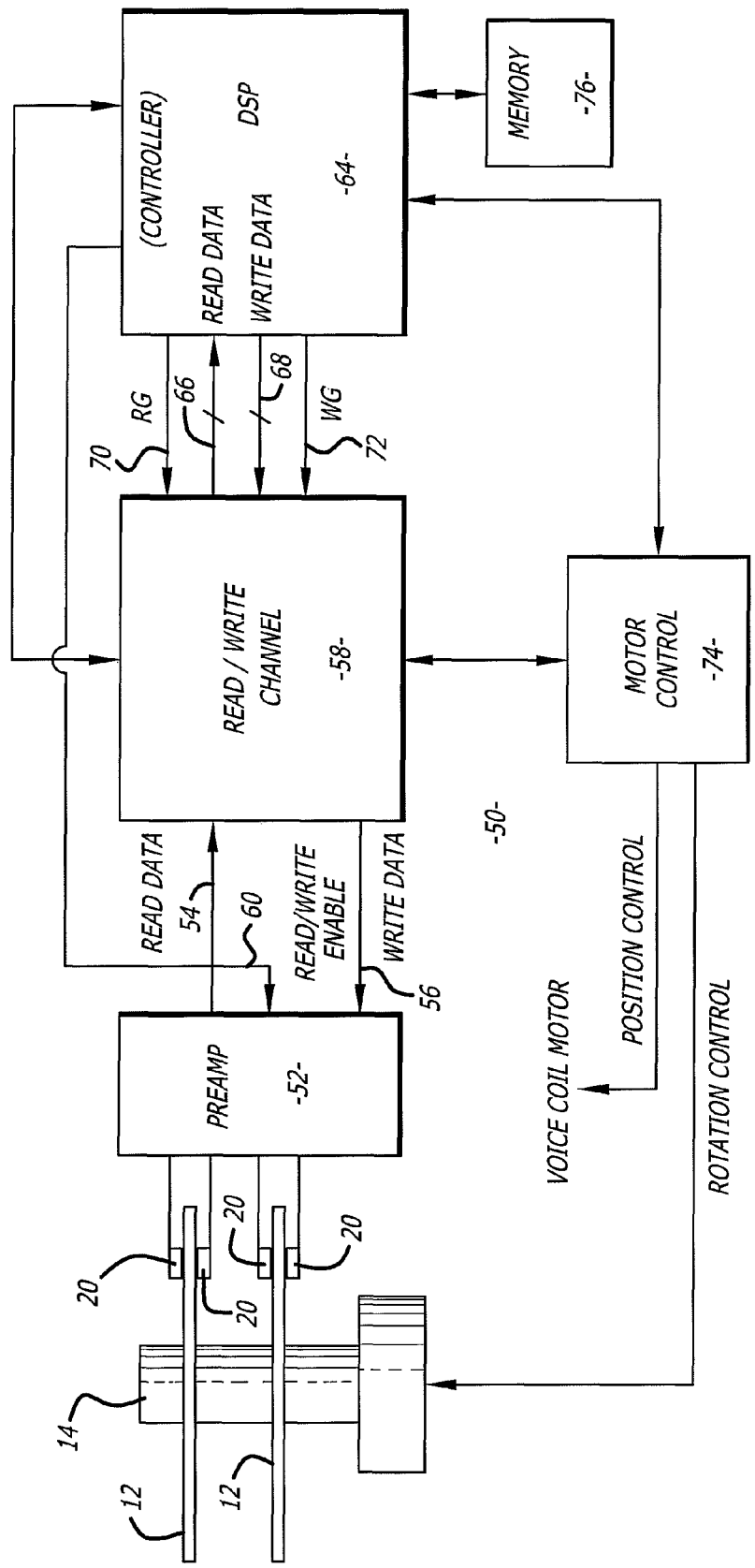
FIG. 2 is a schematic of an electrical circuit for the hard disk drive.

FIG. 2 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 58 is connected to a controller 64 through read and write channels 66 and 68, respectively, and read and write gates 70 and 72, respectively. The read gate 70 is enabled when data is to be read from the disks 12. The write gate 72 is enabled when writing data to the disks 12. The controller 64 may be a digital signal processor that operates in accordance with a software routine, including a routine(s) to write and read data from the disks 12. The read/write channel circuit 58 and controller 64 may also be connected to a motor control circuit 74 which controls the voice coil motor 36 and spindle motor 14 of the disk drive 10. The motor control circuit 74 provides a drive current to the voice coil motor 36 to move the heads 20 relative to the disk 12. The controller 64 may be connected to a non-volatile memory device 76. By way of example, the device 76 may be a read-only-memory ("ROM") that contains instructions that are read by the controller 64.

Figure 3:
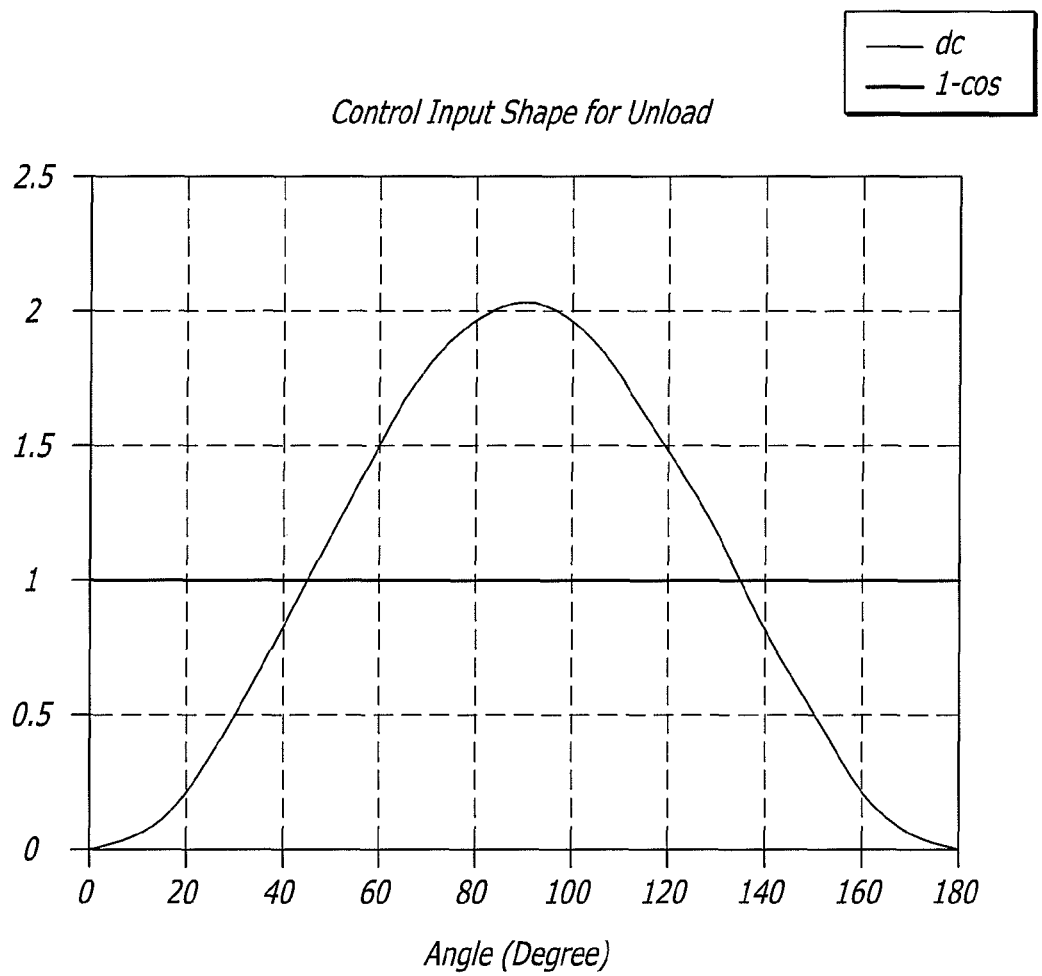
FIG. 3 is a graph showing a drive current provided to a voice coil motor.

FIG. 3 shows the sinusoidal waveform of a drive current that is provided to the voice coil motor during a sample period of an unload routine. In an unload routine, the heads are moved off of the disks. The unload routine may include many sample periods. Each sample period includes a sinusoidal shaped drive current. The half sine wave drive current can be described by the equation 1−cos(2×). It is desirable to determine the back emf of the voice coil motor during the unload routine. The voltage of the voice coil can be measured by the drive and described with the following equation.

$$v = L\,di/dt + Ri + B_{emf}$$

where;

L=The inductance of the voice coil.

di/dt=The time rate of change of the drive current.

i=The drive current.

R=The electrical resistance of the coil and wires.

$B_{emf}$=The back emf of the voice coil motor.

At the beginning and end of each sample period the current is essentially zero. Both the inductance component Ldi/dt and the DC component Ri are zero, such that the back emf is equal to a measured voice coil voltage. There is no need to perform a resistance calibration as is required in the prior art. The back emf can be determined at the beginning and/or end of each sample period and used to calculate head speed. The head speed provides feedback that is used to control the movement of the heads.

Figure 4:
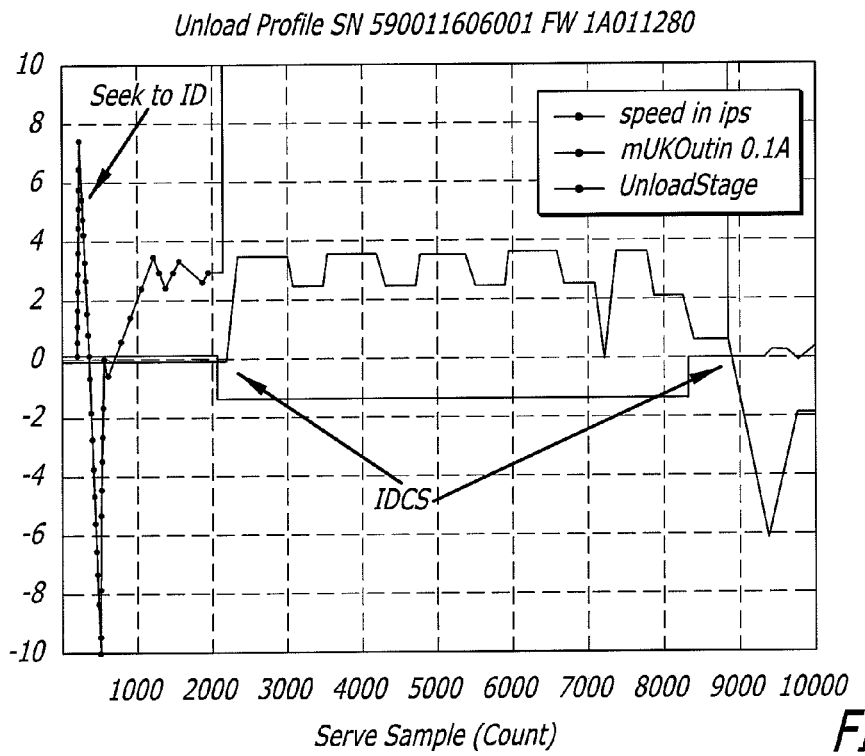
FIG. 4 is a graph showing the time required to complete an unload routine of the prior art that includes a resistance calibration.
Figure 5:
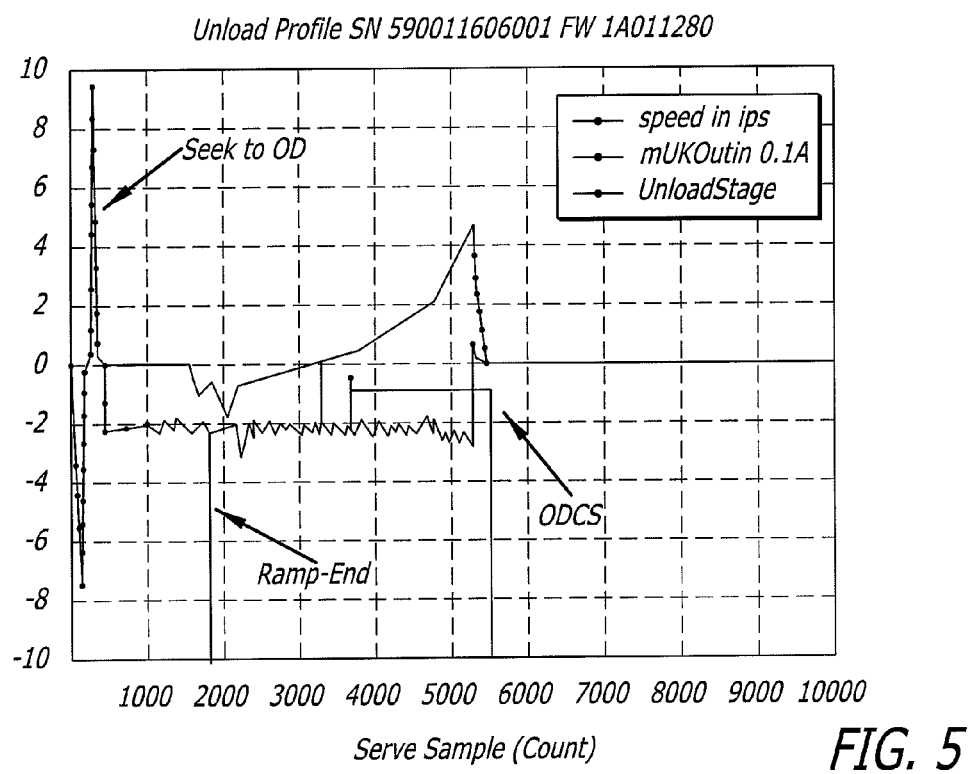
FIG. 5 is a graph showing the time required to complete an unload routine without a resistance calibration.

FIGS. 4 and 5 shows unload routines with and without resistance calibration, respectively. When performing a resistance calibration, the heads are moved to an inner disk crash stop ("IDCS"). As shown by the graphs the time for the unload routine is shorter without a resistance calibration. Additionally, the resistance calibration can cause noise and bounce-back motion that is not found with the unload routine of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
   a disk;
   a head coupled to said disk;
   an actuator arm coupled to said head;
   a voice coil motor that is coupled to said actuator arm; and,
   a drive circuit that provides a drive current with a sinusoidal waveform that passes through zero to said voice coil motor during an unload routine.

2. The hard disk drive of claim 1, wherein said drive current waveform is a one-half sine wave.

3. The hard disk drive of claim 1, wherein a back emf voltage is determined during a sample period of said unload routine.

4. The hard disk drive of claim 3, wherein said back emf voltage is determined when said drive current is essentially zero.

5. The hard disk drive of claim 3, wherein said unload routine includes a plurality of sample periods and the back emf is determined in each sample period.

6. A hard disk drive, comprising:
   a disk;
   a head coupled to said disk;
   an actuator arm coupled to said head;
   a voice coil motor that is coupled to said actuator arm; and,
   circuit means for providing a drive current with a sinusoidal waveform that passes through zero to said voice coil motor during an unload routine.

7. The hard disk drive of claim 6, wherein said drive current waveform is a one-half sine wave.

8. The hard disk drive of claim 6, wherein a back emf voltage is determined during a sample period of said unload routine.

9. The hard disk drive of claim 8, wherein said back emf voltage is determined when said drive current is essentially zero.

10. The hard disk drive of claim 8, wherein said unload routine includes a plurality of sample periods and the back emf is determined in each sample period.

11. A method for unloading a head from a disk in a hard disk drive, comprising:
    initiating an unload routine; and,
    applying a drive current that has a sinusoidal waveform that passes through zero to a voice coil motor.

12. The method of claim 11, wherein the drive current waveform is a one-half sine wave.

13. The method of claim 11, wherein a back emf voltage is determined during a sample period of the unload routine.

14. The method of claim 13, wherein the back emf voltage is determined when the drive current is essentially zero.

15. The method of claim 13, wherein the unload routine includes a plurality of sample periods and the back emf is determined in each sample period.

* * * * *